United States Patent
Viazmensky et al.

(10) Patent No.: US 7,935,646 B2
(45) Date of Patent: May 3, 2011

(54) SPUNBONDED HEAT SEAL MATERIAL

(75) Inventors: Helen Viazmensky, Avon, CT (US); John M. Allen, Kingsport, TN (US); Richard T. Giovannoni, Charlotte, NC (US)

(73) Assignee: Ahlstrom Nonwovens LLC, Windsor Locks, CT (US)

( * ) Notice: Subject to any disclaimer, the term of this patent is extended or adjusted under 35 U.S.C. 154(b) by 0 days.

(21) Appl. No.: 10/297,573

(22) PCT Filed: Jun. 12, 2001

(86) PCT No.: PCT/US01/40919
§ 371 (c)(1),
(2), (4) Date: Aug. 7, 2003

(87) PCT Pub. No.: WO01/96639
PCT Pub. Date: Dec. 20, 2001

(65) Prior Publication Data
US 2004/0018795 A1    Jan. 29, 2004

(51) Int. Cl.
*B32B 5/26* (2006.01)

(52) U.S. Cl. ......... 442/382; 442/59; 442/381; 442/389; 442/400; 442/401; 442/411; 428/131; 428/132; 428/133; 428/134; 428/135; 428/136; 428/137; 428/138; 428/139; 428/140

(58) Field of Classification Search .............. 442/381, 442/382, 389, 400, 401, 411, 59; 428/131–140
See application file for complete search history.

(56) References Cited

U.S. PATENT DOCUMENTS

| | | | |
|---|---|---|---|
| 3,183,096 A | 5/1965 | Hiscock | |
| 3,692,618 A * | 9/1972 | Dorschner et al. | 442/401 |
| 4,289,580 A * | 9/1981 | Elston et al. | 162/109 |
| 4,542,060 A | 9/1985 | Yoshida et al. | 442/389 |
| 4,605,123 A * | 8/1986 | Goodrum et al. | 206/0.5 |
| 4,668,566 A | 5/1987 | Braun | 428/286 |
| 4,789,699 A | 12/1988 | Kieffer et al. | 524/271 |
| 4,904,523 A | 2/1990 | Kampf et al. | 428/288 |
| 5,145,727 A | 9/1992 | Potts et al. | 428/198 |
| 5,219,974 A | 6/1993 | Onwumere et al. | 528/45 |
| 5,227,227 A * | 7/1993 | Boulanger | 442/409 |
| 5,384,189 A * | 1/1995 | Kuroda et al. | 442/352 |

(Continued)

FOREIGN PATENT DOCUMENTS
EP    1 266 997 A    12/2002
(Continued)

OTHER PUBLICATIONS

Supplementary European Search Report dated Oct. 1, 2004 from foreign counterpart application.

(Continued)

*Primary Examiner* — D. Lawrence Tarazano
*Assistant Examiner* — Peter Y Choi
(74) *Attorney, Agent, or Firm* — Alix, Yale & Ristas, LLP

(57) ABSTRACT

Disclosed is a nonwoven web material (10) comprising thermoplastic fibers or filaments and a method of manufacture thereof. The web material has properties desirable for use on machinery having conventional heat sealing stations (26). Also, disclosed is a nonwoven infusion web material comprising thermoplastic fibers or filaments and a method of manufacture thereof. The infusion web material has properties desirable for use in making infusion packages.

17 Claims, 2 Drawing Sheets

U.S. PATENT DOCUMENTS

| | | | |
|---|---|---|---|
| 5,470,639 A * | 11/1995 | Gessner et al. | 428/152 |
| 5,540,976 A | 7/1996 | Shawver et al. | 428/198 |
| 5,560,794 A * | 10/1996 | Currie et al. | 156/73.2 |
| 5,564,263 A * | 10/1996 | Boulanger et al. | 53/479 |
| 5,573,841 A * | 11/1996 | Adam et al. | 442/411 |
| 5,589,258 A | 12/1996 | Maddern et al. | 428/286 |
| 5,597,647 A | 1/1997 | Powers | 442/382 |
| 5,613,601 A * | 3/1997 | Boulanger et al. | 206/0.5 |
| 5,667,562 A | 9/1997 | Midkiff | 96/15 |
| 5,667,619 A | 9/1997 | Alikhan | 156/253 |
| 5,679,042 A | 10/1997 | Varona | 442/347 |
| 5,681,646 A | 10/1997 | Ofosu et al. | 428/198 |
| 5,726,103 A | 3/1998 | Stahl et al. | 442/59 |
| 5,853,635 A | 12/1998 | Morell | 264/103 |
| 5,939,341 A | 8/1999 | Brown et al. | 442/351 |
| 6,884,494 B1 * | 4/2005 | Curro et al. | 442/389 |

FOREIGN PATENT DOCUMENTS

| | | |
|---|---|---|
| GB | 1 111 189 A | 4/1968 |
| JP | 6-65851 | 3/1994 |

OTHER PUBLICATIONS

Smorada, "Nonwoven Fabrics, Spunbonded," *Kirk-Othmer Encyclopedia of Chemical Technology*, Fourth Edition, vol. 17, pp. 336-368.

* cited by examiner

SPUNBONDED HEAT SEAL MATERIAL

FIELD OF THE INVENTION

The present invention relates generally to nonwoven web material. One aspect of the invention is more particularly concerned with new and improved extruded web material suitable for use with packing equipment using heat and pressure type sealing processes. Another aspect of the invention is concerned with an extruded web material useful for infusion applications.

BACKGROUND OF THE INVENTION

Infusion packages for brewing beverages, such as tea bags and coffee bags, are generally produced by enclosing finely ground beverage precursor materials within a porous web material. The beverage precursor materials can include tea, coffee, hot chocolate mix and soup mix. The infusion package is either placed in a cup or pot containing boiling water, or alternatively, the infusion package is placed in an empty cup or pot and subsequently boiling water is added. In either event, the hot water passes through the web material into the bag to extract the beverage precursor materials and the extract passes outwardly of the bag to form the brew.

Infusion packages are generally made from cellulose fiber based nonwoven web materials that are free from perforations or punctures yet possess a high degree of porosity. Particularly favored for infusion packages have been those wet laid fibrous materials made on inclined wire paper making machines using long natural fibers. These web materials are generally soft, tissue-thin fibrous materials characterized by their lightweight and superior infusion characteristics. The fibers used for the production of infusion packages are typically regulated by governing agencies for use as packaging for food products.

While it is desirable for the infusion package to allow extraction of the beverage precursor materials, physical release of the finely ground beverage precursor materials from the sealed infusion package into the cup is undesirable. To prevent movement of finely ground beverage precursor materials from the sealed infusion package into the brewing container, the porosity and "sifting" characteristics of the nonwoven web material are carefully controlled. Importantly, the seam maintaining the beverage precursor materials within the infusion package must maintain integrity to prevent opening of the infusion package and the subsequent undesirable discharge of the finely ground beverage precursor materials into the brew.

Infusion package seams may be of either the "heat seal" or "non-heat seal" variety. In non-heat seal infusion packages, the edges of the web material are brought together, folded a number of times, and this multiple fold is crimped to provide a mechanical crimped seam which seals the infusion package. Typically, the nonwoven web material used for non-heat seal infusion packages includes a single layer comprised of vegetable fibers and does not incorporate fusible polymeric fibers.

Heat sealed infusion packages are typically produced from a wet laid, cellulose based nonwoven material comprising two layers or phases. One of the phases, the heat seal phase, typically includes more than twenty-five percent by dry weight of fusible thermoplastic polymeric fibers. The surface of the second phase, and typically the second phase itself, is substantially free of fusible fibers. The web material is folded so that the phases containing the fusible fibers are in contact. Typically, the folded web material passes between opposing, movable surfaces such as dies, jaws or rollers that are heated to a predetermined temperature. Actuation of the surfaces toward each other provides the required pressure and heat to the folded web material to flow and fuse the touching fusible fibers and create a heat seal seam joining the layers of web material The surface of the second phase functions to prevent buildup of the melted polymeric fibers to the heated surfaces of the dies, jaws or rollers. It is important that the heated surfaces remain substantially free of adherent polymeric fibers to ensure proper function of the heat and pressure type sealing equipment.

It is known to use thermoplastic nonwoven materials formed by spunbonding or meltblowing for specialized sealing applications. Most of the specialized sealing equipment for such materials uses ultrasonic bonding of the contacting web materials in place of application of heat and pressure. Typically, use of spunbonded or meltblown web materials with conventional heat seal equipment leads to undesirable thermoplastic material buildup on the heated surfaces. While ultrasonic bonding avoids the material buildup problems associated with the use of conventional heat and pressure type sealing equipment and thermoplastic spunbonded materials, it is less efficient than conventional heat-seal techniques. In the high speed preparation of mass produced articles such as infusion packages, ultrasonic bonding is slower and less cost effective than conventional heat-sealing techniques and requires modification of existing equipment and processes. Additionally, known spunbonded and meltblown web materials present problems of limpness, tracking and cutting of the web material when used with conventional packing equipment having heat and pressure type sealing processes. Infusion packages made using spunbonded or meltblown materials also present problems of limpness. Further, to be acceptable for infusion packaging web materials must have a minimum combination of infusion properties and such infusion properties are not always present in spunbonded or meltblown web materials.

Definitions

Bicomponent fiber—A fiber that has been formed from at least two polymers extruded from separate extruders through a single spinneret hole to form a single filament. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another or a side by side arrangement.

Biconstituent fiber—A fiber that has been formed from a mixture of two or more polymers extruded from the same spinneret. Biconstituent fibers do not have the various polymer components arranged in relatively constantly positioned distinct zones across the cross-sectional area of the fiber and the various polymers are usually not continuous along the entire length of the fiber, instead usually forming fibrils which start and end at random. Biconstituent fibers are sometimes also referred to as multiconstituent fibers.

Cellulose fiber—A fiber comprised substantially of cellulose. The fibers are typically from natural sources such as woody and non-woody plants although regenerated cellulose fibers are also considered cellulose fibers. Woody plants include, for example, deciduous and coniferous trees. Non-woody plants include, for example, cotton, flax, esparto grass, sisal, abaca, milkweed, straw, jute, hemp, and bagasse.

Cross machine direction (CD)—The direction perpendicular to the machine direction.

Denier—A unit used to indicate the fineness of a filament. The unit expresses the mass of a filament divided by its length, with a filament of 1 denier having a mass of 1 gram for 9000 meters of length.

Extruded web material—A sheet material formed by extrusion of at least one thermoplastic polymer onto a surface to form at least one nonwoven web. The extruded web material can comprise at least one of fibers, filaments, bicomponent fibers, bicomponent filaments, biconstituent fibers and biconstituent filaments. The extruded web material is substantially free of cellulose materials from natural sources. The extruded web material can comprise one or more layers and can comprise post-formation treatments.

Machine direction (MD)—The direction of travel of the forming surface onto which fibers are deposited during formation of a nonwoven web.

Meltblown fiber—A fiber formed by extruding a molten thermoplastic material as filaments from a plurality of fine, usually circular, die capillaries into a high velocity gas (e.g., air) stream which attenuates the filaments of molten thermoplastic material to reduce their diameter. Thereafter, the meltblown fibers are carried by the high velocity gas stream and are deposited on a collecting surface to form a web of randomly dispersed meltblown fibers. Meltblown fibers are generally discontinuous. The meltblown process includes the meltspray process.

Non-thermoplastic material—Any material which does not fall within the definition of thermoplastic material.

Nonwoven fabric or web—A web having a structure of individual fibers which are interlaid, but not in an identifiable manner as in a knitted fabric. Nonwoven fabrics or webs have been formed from many processes such as for example, meltblowing processes, spunbonding processes, and water laying processes. The basis weight of nonwoven fabrics is usually expressed in grams per square meter (gsm) and the fiber fineness is measured in denier.

Polymer—Generally includes, for example, homopolymers, copolymers, such as for example, block, graft, random and alternating copolymers, terpolymers, etc, and blends and modifications thereof. Furthermore, unless otherwise specifically limited, the term "polymer" includes all possible geometrical configurations of the material. These configurations include, for example, isotactic, syndiotactic and random symmetries.

Spunbond fiber—A fiber formed by extruding molten thermoplastic materials as filaments from a plurality of fine, usually circular, capillaries of a spinneret. The diameter of the extruded filaments is then rapidly reduced as by, for example, eductive drawing and/or other well-known spunbonding mechanisms. Spunbond fibers are generally continuous with deniers within the range of about 0.1 to 5 or more.

Thermoplastic—A polymer that is fusible, softening when exposed to heat and returning generally to its unsoftened state when cooled to room temperature. Thermoplastic materials include, for example, polyvinyl chlorides, some polyesters, polyamides, polyfluorocarbons, polyolefins, some polyurethanes, polystyrenes, polyvinyl alcohol, caprolactams, copolymers of ethylene and at least one vinyl monomer (e.g., poly (ethylene vinyl acetates), cellulose esters and acrylic resins.

Two-phase spunbond material—A two-ply, fibrous, nonwoven web material comprised of a first layer or phase spun from a thermoplastic polymer overlaid by a second layer or phase spun from a thermoplastic polymer. The first and second layers are joined or bonded to form the two-phase material.

SUMMARY OF THE INVENTION

Briefly stated, one aspect of the invention comprises a spunbonded or meltblown extruded web material for use with conventional heat and pressure type sealing processes and equipment. The inventive web material can be a two phase material comprised of a first layer or barrier phase extruded from a thermoplastic polymer having a first melting point overlaid by a second layer or heat seal phase extruded from a thermoplastic polymer having a second melting point. The melting point of the heat seal phase is lower than the melting point of the barrier phase. The first and second layers are joined to form the two-phase material. The two layers can be joined by well known methods such as, for example, extruding, calendaring, air bonding, adhesive bonding, embossing, etc.

When surfaces of the two heat seal layers are placed in contact under heat and pressure, the thermoplastic fibers therein flow and fuse, bonding the heat seal layers together. The barrier layer has a higher melting point than the heat seal layer and functions as a barrier to prevent the lower melting point polymer of the heat seal layer from sticking to the heated sealing equipment. The inventive web material will have a bleed through of 40 grams or less when tested as later described.

Many thermoplastic polymers or combinations of thermoplastic polymers can be used for the heat seal phase, such as, for example, polypropylene, polyethylene, polyester and polyamide. The heat seal phase may comprise bicomponent or biconstituent fibers. Biodegradable thermoplastic polymers, for example, aliphatic or partly aromatic amides and aliphatic or partly aromatic polyesters such as polylactic acid, can also be used for the heat seal phase.

Many thermoplastic polymers or combinations of thermoplastic polymers can be used for the barrier phase, such as, for example, polypropylene, polyethylene, polyester and polyamide. Biodegradable thermoplastic polymers, for example, aliphatic or partly aromatic amides and aliphatic or partly aromatic polyesters such as polylactic acid, can also be used for the barrier phase. The barrier phase may comprise bicomponent or biconstituent fibers.

For a two phase, extruded web material, the basis weight of each of the two phases can be in the range of about 0.5 gsm to about 40 gsm. Advantageously the basis weight of the heat seal phase is in the range of about 2 to about 12 gsm and the basis weight of the barrier phase is in the range of about 8 to about 18 gsm.

The basis weight of the extruded web material will be less than about 80 gsm. For a preferred two layer material, the basis weight will advantageously be within the range of about 10 to about 30 gsm, with a nominal basis weight of about 16.5 gsm.

Fiber denier and fiber shape may be varied in known ways to best suit final end use requirements (for example, to achieve desired sift/infusion properties for specific beverage precursor materials). Typically, fiber deniers will range from, for example, 0.1 to 5 denier and advantageously about 0.5 denier to about 3 denier.

The extruded web material can be provided with agents, for example binder, antistatic, surfactant, repellant materials and combinations thereof to further improve nonwoven material characteristics. The agent or agents can be added during production of the extruded web material, for example by adding antistatic agents to the melt zone of the extruder. The agent or agents can also be added after production of the extruded web material, for example by using a size press to add binder to the web material.

Briefly stated, another aspect of the invention comprises a spunbonded or meltblown extruded web material having reduced elongation when compared to conventional spunbonded or meltblown web materials. Advantageously the nonwoven materials of this aspect of the invention have a machine direction (MD) elongation under 1000 gm tension in the range of about 0.5 percent to about 3 percent. In some embodiments the nonwoven material of this aspect of the invention can be provided with postformation treatments including, for example calendaring, embossing and/or addition of a binder agent to provide the reduced elongation. The reduced elongation is required for use on existing high speed packing machinery.

Briefly stated, another aspect of the invention comprises a spunbonded or meltblown extruded web material having a minimum combination of properties making that material suitable for use as an infusion packaging material. Preferably, the web material embodying this aspect of the invention is free from perforations or punctures, has a first color time of less than about 13 seconds and a percent transmittance of less than about 75%.

It is an object of the present invention to provide a new and improved extruded web material.

It is another object of the invention to provide spunbonded extruded web material that can be processed on conventional heat and pressure type sealing equipment.

It is a further object of the invention to provide a spunbonded extruded web material that retains the desirable porosity and infusion characteristics of conventional heat seal infusion web materials.

A better understanding of the invention will be obtained from the following detailed description of the article and the desired features, properties, characteristics, and the relation of the elements as well as the process steps, one with respect to each of the others, as set forth and exemplified in the description and illustrative embodiments.

DETAILED DESCRIPTION

Figure 2:
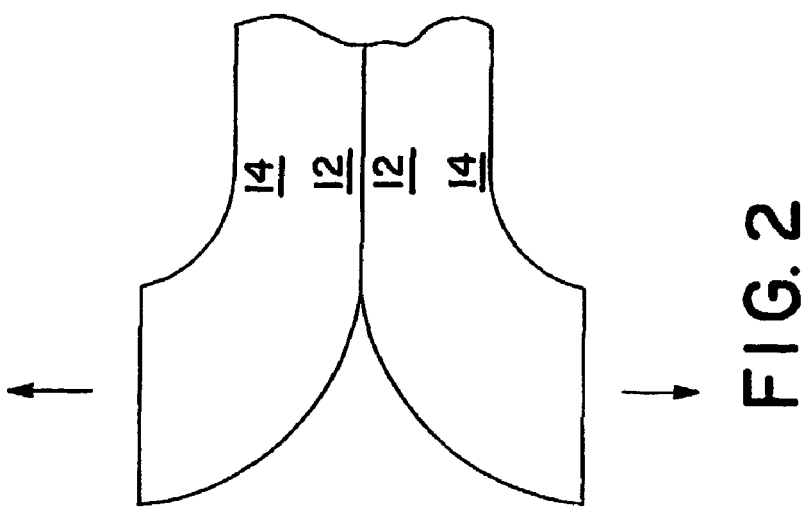
FIG. 2 is a schematic view of an inventive extruded web material arranged for tensile testing in a "bleed through" test.

One aspect of the invention includes an extruded web material comprising thermoplastic fibers or filaments and suitable for use on conventional heat and pressure type sealing equipment without causing excessive or objectionable build up on the heated sealing surfaces thereof. Another aspect of the invention includes an extruded web material comprising thermoplastic fibers or filaments and suitable for use on existing high speed packing equipment. A further aspect of the invention includes an extruded web material comprising thermoplastic fibers or filaments and substantially retaining the desirable infusion properties characteristic of wet laid cellulose based infusion web materials.

In general, the nonwoven extruded web material of the invention can be prepared from noncontinuous fibers, continuous filaments, or a combination thereof. At present, the continuous filaments produced by spunbond techniques are preferred, although meltblown techniques that produce noncontinuous fibers are also considered to be within the scope of this invention. The fibers and/or filaments useful in the inventive extruded web material can include single polymer, bicomponent, biconstituent and mixtures thereof.

The spunbond process generally uses a hopper that supplies polymer to a heated extruder. The extruder supplies melted polymer to a spinneret where the polymer is fiberized as it passes through fine openings arranged in one or more rows in the spinneret, forming a curtain of filaments. The filaments are usually quenched with air at a low pressure, drawn, usually pneumatically and deposited on a moving belt or "forming wire" to form the nonwoven fabric. Polymers useful in the spunbonding process generally have a process melting point or temperature of between about 80° C. to about 320° C. (176° F. to 610° F.). More preferably, the polymers will have a process melting point or temperature of between about 110° C. to about 260° C. (230° F. to 500° F.).

Polymers such as, for example, polyethylene, polypropylene, polyethylene terephthalate and polyamide can be used in the extruded web material. Biodegradable thermoplastic polymers, for example, aliphatic or partly aromatic amides and aliphatic or partly aromatic polyesters such as polylactic acid, can also be used for the barrier phase.

The fibers useful in practicing the invention are usually in the range of from about 0.1 to about 5 denier and more preferably about 0.5 to about 3 denier depending on process conditions and the desired end use for the fabrics to be produced from such fibers. The fiber denier may be adjusted in well-known fashion, such as by increasing the polymer molecular weight, decreasing the processing temperature or changing the quench fluid temperature and/or pneumatic draw pressure.

The fibers useful in practicing the invention can be bicomponent fibers arranged with a first polymer sheath surrounding a second polymer core or in a side by side arrangement. Biconstituent fibers can also be useful in the invention. Fiber shape can be varied to suit final end use requirements.

The extruded web material of the invention is advantageously comprised of multiple phases or layers, incorporating a higher melting point thermoplastic polymer in one layer and a lower melting point thermoplastic polymer in a different layer. The layers are joined by any of a number of well known techniques including, but not limited to, extruding one layer onto another layer, adhesive bonding, needle punching, ultrasonic bonding, thermal embossing and thermal calendaring. More than two layers may be used in practicing the invention. Such a multiple layer extruded web material can be an embodiment wherein some of the layers are comprised of spunbond filaments and some layers are comprised of meltblown fibers, such as a spunbond/meltblown/spunbond laminate or a spunbond/spunbond laminate. A spunbond/spunbond laminate may be made by sequentially depositing onto a moving conveyor belt or forming wire a first spunbond fiber layer, then depositing another spunbond layer over the first spunbond layer and joining the layers. Naturally, both layers could be extruded in staggered fashion so that multiple layered web materials can be formed in a single pass. Alternatively, the layers can be made individually, collected in rolls, and combined in a separate joining step.

It should be kept in mind that in the above description the lower and higher melting point layers could each be either the first laid down or the second laid down webs. As a point of clarification, it should be noted that the term "first laid down web" refers to a web which has been formed earlier in the processing line, or alternatively to a web which has been made and rolled up in a previous step. It should also be noted that as used herein, and particularly in the claims, the terms "first" and "second" are arbitrary designations which do not necessarily refer to their order of forming.

The extruded web material of the invention has a basis weight of about 1 to 80 gsm. In multiple layer embodiments, each layer can have a basis weight of about 0.5 to about 40 gsm. For a preferred two layer embodiment, the heat seal phase can have a basis weight of 2 to 12 gsm and the barrier phase will have a basis weight of 8 to 18 gsm so that the basis weight for the finished two phase web material will be about 10 to 30 gsm and nominally 16.5 gsm. Most preferably, the heat seal phase will have a basis weight of about 8 gsm and the barrier phase will have a basis weight of about 8 gsm so that the basis weight for the finished two phase web material will be about 16 gsm.

Naturally, a heat sealable extruded web material must be capable of forming a heat seal seam of sufficient strength for the intended application. A "dry delamination strength test" measures the maximum force required to separate a dry, heat-sealed seam within a web material.

Dry Delamination Strength Test

The spunbonded web material is folded in half so that each face of the lower melting point phase is adjacent or touching and each higher melting point phase faces outward. Optionally, the folded web is placed within a folded piece of cellulose fiber paper of identical or larger size. The cellulose paper functions to prevent sticking of the lower melting point heat seal phase to the heated surfaces of a heat seal machine in web materials with higher bleed through. The spunbonded web material within the cellulose paper is than placed under heat and pressure to form a heat seal seam as described below.

The heat seal seam is formed between the web material by pressing the folded spunbonded web material/cellulose paper combination between the heated jaws of a thermal bar type heat sealing machine. The heat and pressure causes the thermoplastic fibers within the lower melting point phases to flow and fuse to form a seam. The heat sealing machine should provide a one inch wide seam. A SENTINEL 12-AS thermal bar heat sealer available from Sentinel Machinery of Hyannis Mass. has been found suitable. The jaw temperature is dependent on the materials being joined. Typically the jaw temperature should be at least 10° C. higher than the melting point of the lowest melting point material for an adequate seam to be formed. Typically, the jaws are maintained at pneumatic cylinder pressure of 72 psi, imposing a force on the jaws that is maintained for a dwell time of 0.38 seconds.

After imposing heat and pressure on the sample, the heat sealed web material/cellulose paper combination is removed from the heat seal machine and the spunbonded web material is separated from the cellulose paper. The heat-sealed sample is cut to obtain a one-inch wide test sample with the heat sealed seam traversing the width of the sample. Each side of the heat sealed web material is clamped in a jaw of a tensile test instrument. The seam is placed under an increasing tensile force and the maximum force required to effect seam failure is recorded. The maximum force required to separate the heat-sealed seam represents the dry delamination strength. Minimum acceptable dry delamination strength for a web material used for infusion applications will be 150 gm and more preferably about 300 gm.

The strength of the heat seal seam in a hot, aqueous environment is also important in certain applications such as infusion packaging, where the seam is immersed in hot or boiling water. A "wet delamination strength test" measures the time required to separate a heat-sealed seam placed under a specified load in a hot, aqueous environment.

Wet Delamination Strength Test

A six inch long by two inch wide test specimen of heat sealable web material is folded to form a loop with the lower melting point heat seal phases touching at the edges. Heat and pressure is applied as above to create a 0.25 inch wide heat sealed seam joining the edges of the test specimen loop. The joined loop is suspended in a distilled water bath heated to about 200° F. with the seam positioned midway between the top and bottom of the loop. A weight is placed within the bottom of the loop and the time required for the seam to break is recorded. Minimum acceptable heat seal seam wet delamination time for the inventive extruded web materials using a 100 gm weight will be 600 seconds. More preferably the heat seal seam wet delamination time will be about 1200 seconds.

In some embodiments of the invention, an important aspect of the inventive extruded web material is compatibility with conventional heat and pressure type sealing equipment. To ensure such compatibility, the spunbonded web material must not only provide an adequately strong heat-sealed seam, but also resist leaving deposits on the heated sealing surfaces. It is undesirable for the lower melting point heat seal phase of the spunbonded material to flow or "bleed through" the higher melting point base phase during heat sealing operations such as in tea bag production. This bleed through behavior results in "build-up" and contamination of the heat seal equipment. To measure the resistance of the spunbonded web material to build up on heated surfaces a "bleed through test" is used.

Bleed Through Test

Figure 1:
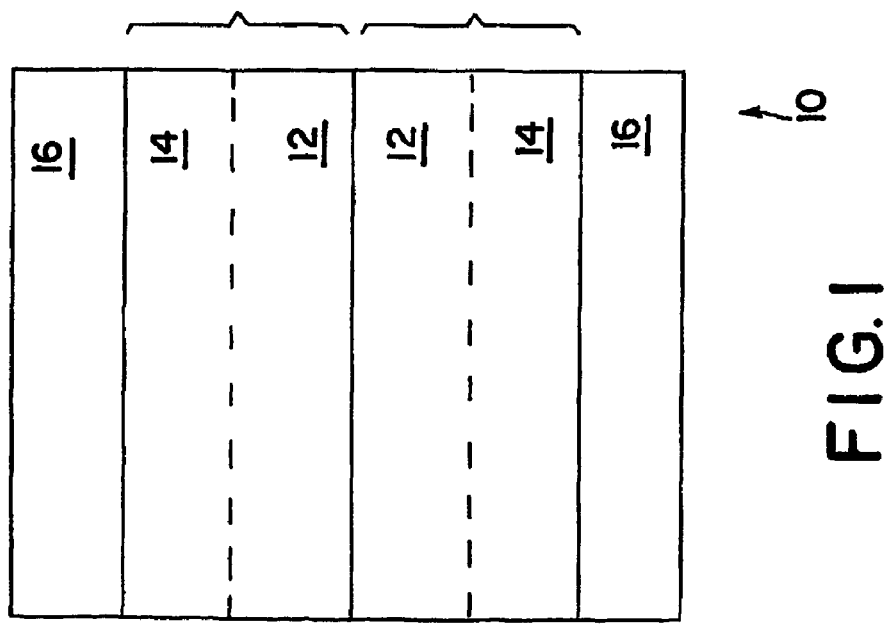
FIG. 1 is a schematic view of an inventive extruded web material arranged for heat sealing in a "bleed through" test.

With reference to FIG. 1, the spunbonded web material 10 is folded in half so that the faces of each higher melting point phase 12 are adjacent and each lower melting point phase 14 faces outwardly. The folded web is placed within a folded piece of cellulose fiber paper 16 of identical or larger size. The cellulose paper functions to prevent sticking of the lower melting point heat seal phase to the heated surfaces of a heat seal machine. The spunbonded web material within the cellulose paper is than placed under heat and pressure (shown by arrows) to form a heat seal seam as more fully described below.

The heat seal seam is formed between the web material sides by pressing the folded spunbonded web material/cellulose paper combination between the heated jaws of a thermal bar type heat sealing machine. The heat sealing machine should provide a one inch wide seam. A SENTINEL 12-AS thermal bar heat sealer has been found suitable for use in this test. Typically, the jaws are maintained a pneumatic cylinder pressure of 72 psi, imposing a force on the jaws, which is maintained for a dwell time of 0.5 seconds. The jaw temperature is dependent on the materials being joined. Typically the jaw temperature should be at least 10° C. higher than the melting point of the lowest melting point material for an adequate seam to be formed.

After imposing heat and pressure on the sample, the heat sealed web material/cellulose paper combination is removed from the heat sealer and the web material is separated from the cellulose paper. The heat-sealed sample is cut to obtain a one inch wide by one half-inch long test sample with the heat sealed seam traversing the width of the sample. Each side of the heat sealed web material is clamped in a jaw of a tensile test instrument as shown in FIG. 2. The seam is placed under an increasing tensile force and the maximum force required to effect seam failure is recorded. The maximum force required to separate the heat sealed seam represents a measure of the level of "bleed through" of the lower melting point heat seal phase through the higher melting point base phase. A high maximum force value recorded in the bleed through test indicates that web material has a high probability of experiencing undesirable thermoplastic fiber build up and contamination conditions with conventional heat and pressure type sealing equipment. Presently, it is preferred that a heat sealable spunbonded web material has a bleed through of 40 grams or less. It should be noted that if the heat seal machine jaw temperature were sufficiently high, the barrier phase would also be induced to melt, flow and seal.

To test a single-phase material for bleed through behavior, the single-phase spunbonded web material is folded in half to provide contacting sides and the folded web material is placed within a folded piece of cellulose fiber paper. The spunbonded web material within the cellulose paper is placed under heat and pressure to form a heat seal seam as previously described. The web material will also be bonded to the cellulose paper. The heat sealed material is cut to obtain a one inch wide test sample comprising a layer of cellulose paper joined to a layer of spunbonded web material by the heat sealed seam traversing the width of the sample. Each layer is clamped in the jaws of a tensile test instrument, the seam is placed under an increasing tensile force and the maximum force required to separate the bond between the web material and cellulose fiber paper is recorded. The maximum force required represents a measure of the level of "bleed through" of the lower melting point heat seal phase through the cellulose paper layer.

Figure 3:
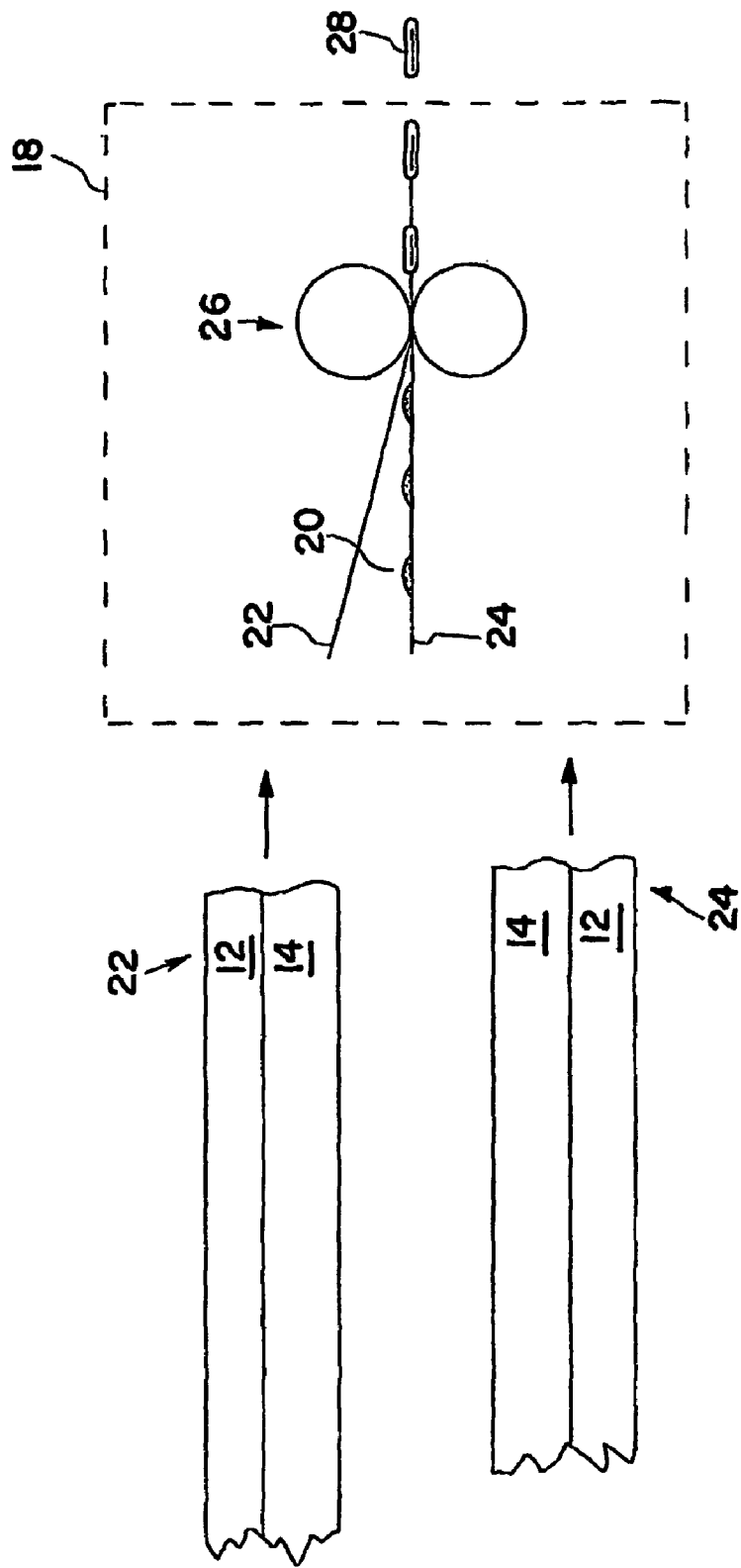
FIG. 3 is a schematic illustration of a conventional packing machine using a heat and pressure type seal process for formation of the inventive extruded web material into infusion packages.

Conventional cellulose based heat and pressure sealable nonwoven web material is often fed from a roll onto high speed web handling machinery such as equipment used to prepare single serving infusion packages of tea or coffee. As schematically represented in FIG. 3 the packing and sealing equipment 18 typically disposes a beverage precursor material 20 between two portions of web material 22, 24. The heat seal phases 14 of each portion 22, 24 are adjacent with the barrier phases of each portion 22, 24 facing outwardly. The portions 22, 24 with beverage precursor material 20 are fed through a heat and pressure type sealing unit 26 to form a heat seal seam in the portions 22, 24, enclosing the beverage precursor material therein. The portions 22, 24 are separated to form infusion packages 28. Some examples of such high speed packing machinery using heat and pressure type sealing processes include the EC12 single-lane packaging machine manufactured by Mai s.a. of Mar de Plata, Argentina (EC12) that can prepare 150 infusion packages per minute; the Rotorex single-lane packaging machine manufactured by Delamere & Williams of Toronto, Canada (D & W) that can prepare 350 infusion packages per minute; the type 1000 4-lane packaging machine manufactured by Technipac Engineering of Ronford, Essex, U.K. (TECHNIPAC) that can prepare 800 infusion packages per minute and the C51 two-lane machine manufactured by IMA Industrial Machine Automatiche S.p.A. of Bologna, Italy (C51) that can prepare approximately 2,000 infusion packages per minute. Such equipment is required to feed web material at speeds up to 250 feet per minute in order to prepare infusion packages at the above rates. Surprisingly, high speed web handling machinery such as the above infusion package packing and sealing equipment has been found to operate best within narrow ranges of product thickness, stiffness and elongation. In aspects of the invention for use with such equipment, it is advantageous that the inventive extruded web material has a thickness in the range of about 30 to about 100 microns ($\mu$) and preferably in the range of about 50 to about 80 ($\mu$).

Nonwoven web material dry elongation is measured by a "dry elongation test". The dry elongation test is performed in accordance with TAPPI Test Method T494 OM 88. An Instron 1122 tensile test instrument can be advantageously used in conjunction with the dry elongation test. For a 1000 gram load it is advantageous that the inventive extruded web material have a dry elongation in the range of about 0.5 percent to about 3 percent. Preferably the dry elongation is in the range of about 0.5 percent to about 2 percent.

In embodiments of the invention used for the preparation of infusion packages containing tea, buildup and retention of a charge of static electricity on the web material can be a concern. The static charge can attract tea particles to seam areas or across the interior surface of the infusion package, causing a less desirable appearance of the finished product. The ability of a web to discharge a static electricity buildup can be measured by an "electrostatic decay test".

Electrostatic Decay Test

A three inch by five and one half inch test specimen is cut from a nonwoven web with the greater length as the direction to be tested. The test specimen is conditioned by placement in a controlled environment having a relative humidity of 50±4% and a temperature of 73.4±2° F. for at least 10 minutes. The test specimen is placed between the electrodes of a static decay meter with the side to be measured facing the sensing head. A Static Decay Meter model 406C from Electro-Tech Systems, Inc. of Glenside, Pa. 19038 has been found suitable. The test specimen is inductively charged with 5,000 volts DC. The maximum voltage developed on the test specimen is measured and the time required for dissipation to ten percent of the measured maximum voltage is determined. It is believed to be advantageous that the inventive extruded web material used for tea containing infusion packages have a static decay in the range of about 1 second to about 60 seconds and preferably in the range of about 1 second to about 40 seconds.

In some embodiments the inventive extruded web material can incorporate additional processing steps such as calendaring or embossing. The calendaring or embossing processes partially melt and fuse some of the fibers in the material. These post-formation processes increase web stiffness, which can be beneficial in some applications.

In some embodiments the inventive extruded web material can incorporate an additional material such as, for example, at least one of binder material, antistatic agent, surfactant or repellant to further improve spunbonded material characteristics. The material or materials can be added during production of the extruded web material, for example by adding antistatic agents to the melt zone of the extruder. The material or materials can also be added after production of the extruded web material, for example by using a size press to add binder to the web material. In one embodiment of the invention, the inventive extruded web material is treated throughout its extent with a binder material which, when set or cured, is insoluble in aqueous solutions and unaffected by boiling water. The binder provides increased strength, stiffness and reduced elongation. Additionally, the binder material utilized according to the invention should exhibit an affinity for being readily absorbed into the fibers of the web material. In embodiments of the invention wherein the inventive extruded web material is used for infusion packaging the binder material must provide the above desirable properties while substantially retaining the porosity of the web and without adversely affecting the desirable infusion characteristics of the treated web material. Accordingly, the materials used herein are distinguished from materials that form solid films over the treated area.

The binder materials found to be useful in the invention include, for example, carboxylated polystyrene, SBR based materials, PVA based materials and acrylic dispersion polymers. TN586 available from B. F. Goodrich of Cleveland, Ohio has been found suitable for use in the invention. Naturally, other binder materials providing the desired strength, stiffness and/or reduced elongation properties to the extruded web material would also be useful in the invention and are encompassed therein.

The binder material may be applied to the preformed extruded web material by well-known techniques used to add such materials while ensuring complete coverage of the web material. For example, the web material may be treated by brush, roller, spray, foam or immersion bath to effectuate the desired binder material application to the web material. Since complete impregnation of the web material is desired, a saturation treatment is preferred. The binder emulsions generally penetrate quickly through the rather thin and absorbent web material and may be applied during a suitable stage in the manufacture of the fibrous web material. For example, a saturating size press containing the binder material may be used prior to the final drying and collection of the web material. After treating the extruded web material with the dispersion of binder material, which very quickly permeates through the entire thickness of the web material, the treated web material is subjected to a thermal or heat cure in order to set the binder and prevent leaching of the binder material from the web material.

The binder material may be applied in undiluted form or may be diluted with water to provide the desired binder concentration, viscosity and pick up by the web material during application. The binder material should be applied so that the finished web material may have a binder loading, within the range of about 1 percent to about 50 percent of the final web material basis weight. Preferably the finished web material has a binder loading within the range of about 5 percent to about 30 percent of the final web material basis weight. Calendering and/or embossing can be used in combination with the above additional materials.

It should be realized that every nonwoven web material, whether wet laid, spunbond or melt blown, is not suited for use in infusion packaging. Acceptable infusion web materials must have suitable porosity to permit infusion yet also be free of perforations. Generally porosity is influenced by, e.g. basis weight of the web material. Infusion web materials must also have a minimum combination of seam strength, water permeability, and infusion properties. For ease of understanding and clarity of description, the invention is below described in its application to heat sealable porous infusion web materials for use in the manufacture of tea bags and the like.

Some infusion characteristics of importance relative to heat sealable extruded web material for infusion use relate to the rate at which water can pass into the tea bag and tea liquor can pass out of the tea bag as well as the degree of extraction which is able to take place within a specified time. This is usually reported in terms of "first color" and "percent transmittance", respectively.

First Color Time Test

When testing for first color, a tea bag made from the material to be tested is carefully placed in quiet distilled water after the water has been brought to a boil. Using a stopwatch, the time is recorded at which the first amber stream appears at the bottom of the sample. For a web material having a basis weight of about 14 gsm, a first color time of less than 12 seconds is required with less than 10 seconds being preferred. A first color of about 5-7 seconds is considered indicative of excellent infusion characteristics. Of course, thicker, heavier basis weight materials typically will have higher first color values than lighter basis weight materials.

Percent Transmittance

The percent transmittance test is conducted by measuring the transmittance of the brew after a 60 second steep time using a colorimeter set at a wavelength of 530 mµ and a 1 cm optical path cell. A target value for good infusion is in the mid-sixty percentile range with transmittance decreasing as infusion improves.

Sift refers to the ability of a nonwoven web material to retain particles of a specified size. Naturally, this property is important to infusion packaging that must retain finely ground tea or coffee particles within the packaging. Sift is measured by a "sift test".

Sift Test

The sand is placed in a jar and a sample of web material is secured over the mouth of the jar. The surface area of the web material being tested is 8.6 square inches. A cup is placed over the web material to collect particles sifting through the web material. The assembly is shaken or oscillated for fourteen minutes. Sift is usually measured as a percent loss of sand particles of specified size. A sift test result of less than 30 percent loss is desired for infusion web applications and a result of less than 10 percent loss is preferred.

One aspect of the invention comprises an extruded web material for use in preparing infusion packages on high speed packing equipment using heat and pressure type sealing processes. In this application the inventive extruded web material must provide a combination of stiffness and minimal dry elongation to allow acceptable use with high speed packing equipment; adequate seam strength to permit sealing of the beverage precursor material within the infusion package using heat and pressure type processes; minimal bleed through to minimize buildup of web material on the heated sealing surfaces and acceptable infusion properties to allow use of the finished infusion package to form a brew.

Having generally described the invention, the following examples are included for purposes of illustration so that the invention may be more readily understood. The below described machine trials are based on use of the inventive extruded web materials on conventional packing machines using heat and pressure sealing processes and equipment under conditions typically used with conventional, cellulose based, heat sealable nonwoven materials. While some of the inventive web materials may have exhibited unacceptable properties under some conditions, it should be understood that use of the same extruded web material under slightly different conditions or in different applications can be acceptable. Therefore the following examples are in no way intended to limit the scope of the invention unless otherwise specifically indicated.

Examples 1-4

A number of single layer web materials were prepared and tested for specific infusion characteristics. Example 1 was a comparative web material comprising a two-phase, wet laid, heat sealable, cellulose fiber based nonwoven web material typically used in infusion applications. The non-heat seal or barrier phase comprises cellulose materials and the heat seal phase comprises polypropylene fibers. The material of Example 1 typically has a basis weight of about 16.5 gsm.

Example 2 comprised a single layer extruded web material of spunbonded polyethylene terephthalate (PET) filaments. The material of Example 2 had a basis weight of 15 gsm.

Example 3 comprised a single layer extruded web material of spunbonded bicomponent filaments. The bicomponent filaments of Example 3 comprised polyethylene and polyester polymers arranged in a sheath/core configuration respectively. The material of Example 3 had a basis weight of 15 gsm.

Example 4 comprised a single layer extruded web material of spunbonded polypropylene (PP) filaments. The web material of Example 4 was prepared on REIFENHAUSER spunbonding equipment available from Reifenhauser of Troisdorf, Germany. The material of Example 4 had a basis weight of 15 gsm. Each of the Examples was tested for first color and percent transmittance. The results are summarized in Table 1 below.

TABLE 1

|  | Comp. Example 1 | Example 2 | Example 3 | Example 4 |
|---|---|---|---|---|
| first color (sec.) | 5.7 | 6.13 | 6.04 | 4.78 |
| transmittance (%) | 69.9 | 64.7 | 70.5 | 70.8 |

Examples 2-4 exhibited excellent first color values for use in infusion packaging. Examples 3 and 4 exhibited somewhat high, although acceptable percent transmittance values for use in infusion packaging.

Examples 5-8

A number of single and multiple layer extruded web materials were produced. Example 5 comprised a single layer extruded web material of spunbonded polypropylene having a melting temperature of about 162° C. ESCORENE PP3155 from Exxon Chemical, Polymers Group, of Houston, Tex. is an example of a polypropylene material having a melting temperature of about 162° C. such as used in Example 5.

Example 6 comprised a single layer extruded web material of spunbonded polypropylene having a melting temperature of about 151° C. ACHIEVE 3825 from Exxon Chemical, Polymers Group, of Houston, Tex. is an example of a polypropylene material having a melting temperature of about 151° C. such as used in Example 6.

Example 7 comprised a two-layer extruded web material. A layer of spunbonded polypropylene having a melting temperature of about 162° C. (ESCORENE PP3155) was overlaid with a layer of spunbonded polypropylene having a melting temperature of about 151° C. (ACHIEVE 3825).

Example 8 comprised a two-layer extruded web material. A layer of spunbonded polypropylene having a melting temperature of about 162° C. (ESCORENE PP3155) was overlaid with a layer of spunbonded polyethylene having a melting temperature of 125° C. ASPUN 6811A from Dow Chemical of Midland, Mich. is an example of a polyethylene material having a melting point of about 125° C. such as used in Example 8.

Each of the inventive web materials in Examples 5-8 had a final web material basis weight of about 16.5 gsm. This basis weight was a function of equipment setup. Other basis weights can be used depending on parameters such as particular equipment, polymers used and end use requirements. All of the fibers produced in Examples 5-8 were round in cross-sectional shape.

Each of materials in Examples 5-8 was prepared on spunbonding equipment. The multi-layer web materials of Examples 7 and 8 were prepared by extruding a base layer. The formed base layer was run through the spunbonding equipment a second time and the second layer was extruded onto the base layer. After extrusion of the second layer, the web material was run through a thermal embosser to join the layers. Samples of web materials from Examples 5-8 were hot calendared through a pair of steel rolls to increase stiffness. One of the rolls was heated to about 250-260° F.

Each of the materials in Examples 5-8 was tested for seam dry delamination strength (both MD and CD directions), seam wet delamination strength (both MD and CD directions), bleed through and selected infusion characteristics. The results are summarized in Table 2.

TABLE 2

|  | Example 5 | | Example 6 | | Example 7 | | Example 8 | |
|---|---|---|---|---|---|---|---|---|
| polymer | PP | | PP | | PP/PP | | PP/PE | |
| melting point (° C.) | 162 | | 151 | | 162/151 | | 162/125 | |
| denier | 0.85 | | 0.85 | | 0.85/0.85 | | 0.85/1.7 | |
| bleed through (gm) | 10 | | 47 | | 4 | | 524 | |
|  | MD | CD | MD | CD | MD | CD | MD | CD |
| dry delamination strength (gm/25 mm width) | 131 | 195 | 805 | 343 | 618 | 348 | 605 | 215 |
| wet delamination strength (gm/25 mm width) | 1200 | 1200 | 1200 | 1200 | 1200 | 1200 | 1200 | 1200 |

TABLE 2

|  | Example 5 | Example 6 | Example 7 | Example 8 |
|---|---|---|---|---|
| first color (sec) | 8.89 | 6.28 | 5.57 | 7.95 |
| transmittance (%) | 72.0 | 69.0 | 71.0 | 68.5 |
| "A" sand sift (%) | 0.92 | 1.57 | 1.52 | 85.28 |

The single ply extruded web material of Example 5 produced slightly lower than desired dry delamination strength values; good wet delamination strength values and acceptable bleed through values. The web material of Example 5 exhibited good first color time; slightly higher than preferred percent transmittance values and very good sift values.

The single ply extruded web material of Example 6 produced very good dry delamination strength values; good wet delamination strength values, but higher than preferred bleed through values. The web material of Example 6 exhibited excellent first color time; slightly higher than preferred percent transmittance values and very good sift values.

The two-phase extruded web material of Example 7 produced very good dry and wet delamination strength values and very low bleed through. The web material of Example 7 exhibited excellent first color time; slightly higher than preferred percent transmittance values and very good sift values.

The two-phase extruded web material of Example 8 produced very good dry and wet delamination strength values, but unacceptably high bleed through values. The web material of Example 8 exhibited a good first color time and good percent transmittance values. This web material exhibited unacceptable sift values.

A roll of the extruded web material of Example 5 was run on an EC12 machine. Typically, the EC12 machine is run at a heat seal station temperature of 120° C. with cellulose based nonwoven material such as exemplified by comparative Example 1. At 120° C. a buildup of polypropylene from the extruded web material was apparent on the surfaces of the heat sealer unit. The heat seal station temperature was reduced to a temperature of 85° C. where buildup on the heat sealer unit was eliminated; however the packages produced had no heat seal seam strength.

A roll of the extruded web material of Example 7 was run on an EC12 machine. As the heat seal station temperature was raised from 85° C. to 101° C., the heat seal seams began to "wrinkle". The seam wrinkling indicated shrinkage of the lower melting point layer. In this heat seal station temperature range the heat seal seams were judged by the packing machine operator to have unacceptable seam strength as compared to heat seal seams formed in conventional cellulose based nonwoven material. The extruded web material did not have sufficient stiffness for the string of sealed packages to be cut into individual packages.

A roll of the extruded web material of Example 7 was run on a D & W machine. The D & W machine is typically run at a heat seal station temperature of 150° C. with conventional cellulose based nonwoven material as exemplified by comparative Example 1. On this type of machine the web material is first cut into individual pieces before being passed through the heat seal station for heat seal seam formation. In a heat seal station temperature range of 135° C. to 171° C. the infusion packages produced were judged by the packing machine operator to have unacceptable heat seal seam strength as compared to infusion packages produced from cellulose based nonwoven material. The unacceptable heat seal seam strength is believed to be an artifact of stretching of the inventive web material under tension and subsequent relaxation during the cutting operation, resulting in seam areas that were narrower than desired.

A roll of the extruded web material of Example 8 was run on the EC12 machine. In the heat seal station temperature range of 80° C. to 92° C. the inventive web material had a tendency to melt on a tension control roller adjacent to the heat seal station. In this heat seal temperature range the infusion packages produced were judged by the packing machine operator to have unacceptable heat seal seam strength as compared to infusion packages produced using cellulose based nonwoven material. The inventive web material did not have sufficient stiffness for the string of sealed infusion packages to be cut into individual packages.

In summary, the extruded web materials of Examples 7 and 8 had insufficient stiffness and dimensional stability during heat sealing for acceptable performance on the above packing machines using heat and pressure type sealing processes as compared to cellulose based nonwoven material on the same machines and under the same conditions.

Examples 9-22

Example 9 was a single phase, extruded web material comprising spunbonded polyethylene terephthalate filaments. Each filament had a denier of about 1. The polyethylene terephthalate filaments had a melting point of about 250° C. F61 HC available from Eastman Chemical of Kingsport Tenn. is an example of a polyethylene terephthalate material having a melting point of about 250° C. as used in Example 9. The web material of Example 9 had a basis weight of about 8 gsm.

Example 10 was a single phase extruded web material comprising spunbonded bicomponent filaments. Each filament was in a sheath over core configuration and had a denier of about 0.5. Each filament comprised a sheath of polypropylene having a melting point of about 162° C. (ESCORENE 3155) and a core of polyethylene terephthalate having a melting point of 250° C. (F61 HC). The ratio by weight of sheath material to core material was about 1:1. The web material of Example 10 had a basis weight of about 8 gsm.

Example 11 comprised a two phase extruded web material produced by extruding the material of Example 10 over the preformed web of Example 9. The two phases exhibited some adhesion after extrusion of the second phase over the first phase. The two phases were further joined by calendaring with a point-bonded calendaring roll with a point surface area of twenty percent. The calendar roll was heated to 150° C. The extruded web material of Example 11 comprised a first phase of about 0.5 denier bicomponent filaments having a polypropylene sheath (melting point of about 162° C.) over a polyethylene terephthalate core (melting point of about 250° C.) overlying a second phase of about 1 denier polyethylene terephthalate filaments (melting point about 250° C.). The basis weight for the web material of Example 11 was about 16 gsm.

Example 12 was a single phase extruded web material comprising spunbonded bicomponent filaments. Each filament was in a sheath over core configuration and had a denier of about 0.9. Each filament comprised a sheath of polyethylene having a melting point of about 125° C. (ASPUN 6811) and a core of polyethylene terephthalate having a melting point of 250 C. (F61 HC). The ratio by weight of sheath material to core material was about 1:1. The web material of Example 12 had a basis weight of about 8 gsm.

Example 13 comprised a two phase extruded web material produced by extruding the material of Example 12 over the preformed web of Example 9. The two phases exhibited some adhesion after extrusion of the second phase over the first phase. The two phases were further joined by calendaring with a point-bonded calendaring roll with a point surface area of twenty percent. The calendar roll was heated to 110° C. The web material of Example 13 comprised a first phase of about 0.9 denier bicomponent filaments having a polyethylene sheath (melting point of about 125° C.) over a polyethylene terephthalate core (melting point of about 250° C.) overlying a second phase of about 1 denier polyethylene terephthalate filaments (melting point of about 250° C.). The basis weight for the web material of Example 13 was about 16 gsm.

Example 14 was a single phase extruded web material comprising spunbonded bicomponent filaments. Each filament was in a side by side configuration and had a denier of about 0.9. Each filament comprised a side of polyethylene having a melting point of about 125° C. (ASPUN 6811) attached to a side of polyethylene terephthalate having a melting point of 250° C. (F61 HC). The ratio by weight of one side to the other side was about 1:1. The web material of Example 14 had a basis weight of about 8 gsm.

Example 15 comprised a two phase extruded web material produced by extruding the material of Example 14 over the preformed web of Example 9. The two phases exhibited some adhesion after extrusion of the second phase over the first phase. The two phases were further joined by calendaring with a point-bonded calendaring roll with a point surface area of twenty percent. The calendar roll was heated to 110° C. The extruded web material of Example 15 comprised a first phase of about 0.9 denier bicomponent filaments having a polyethylene side (melting point of about 125° C.) attached to a polyethylene terephthalate side (melting point of about 250° C.) overlying a second phase of about 1 denier polyethylene terephthalate filaments (melting point of about 250° C.). The basis weight for the web material of Example 15 was about 16 gsm.

Example 16 was a single phase nonwoven spunbond extruded web material comprising bicomponent filaments. Each filament was in a side by side configuration and had a denier of about 0.5. Each filament comprised a side of polypropylene having a melting point of about 162° C. (ES- CORENE 3155) and a side of polyethylene terephthalate having a melting point of 250° C. (F61 HC). The ratio by weight of one side to the other side was about 1:1. The web material of Example 16 had a basis weight of about 8 gsm.

Example 17 comprised a two phase extruded web material produced by extruding the material of Example 16 over the preformed web of Example 9. The two phases exhibited some adhesion after extrusion of the second phase over the first phase. The two phases were further joined by calendaring with a point-bonded calendaring roll with a point surface area of twenty percent. The calendar roll was heated to 150° C. The web material of Example 17 comprised a first phase of about 0.5 denier bicomponent filaments having a polypropylene side (melting point of about 162° C.) attached to a polyethylene terephthalate side (melting point of about 250° C.) overlying a second phase of about 1 denier polyethylene terephthalate filaments (melting point of about 250° C.). The web material of Example 17 had a basis weight of about 16 gsm.

Example 18 was a single phase extruded web material comprising spunbonded filaments of about 1.1 denier. Each filament was comprised of polypropylene having a melting point of about 162° C. (ESCORENE 3155). The web material of Example 18 had a basis weight of about 8 gsm.

Example 19 was a single phase extruded web material comprising spunbonded bicomponent filaments. Each filament was in a side by side configuration and had a denier of about 1.7. Each filament comprised a side of polypropylene having a melting point of about 162° C. (ESCORENE 3155) attached to a side of polyethylene having a melting point of about 125° C. (ASPUN 6811). The ratio by weight of one side to the other side was about 1:1. The web material of Example 19 had a basis weight of about 8 gsm.

Example 20 comprised a two phase nonwoven extruded web material produced by extruding the material of Example 19 over the preformed web of Example 18. The two phases exhibited some adhesion after extrusion of the second phase over the first phase. The two phases were further joined by calendaring with a point-bonded calendaring roll with a point surface area of twenty percent. The calendar roll was heated to 140° C. The web material of Example 20 comprised a first phase of about 1.7 denier bicomponent filaments having a polypropylene side (melting point about 162° C.) attached to a polyethylene side (melting point about 125° C.) overlying a second phase of about 1.1 denier filaments comprised of polypropylene (melting point about 162° C.). The basis weight for the web material of Example 20 was about 16 gsm.

Example 21 comprises a portion of the extruded web material produced as Example 11 and calendared after web formation using one smooth, steel roll and one smooth rubber roll. The steel roll was heated to about 150° C. and the rubber roll was left at ambient temperature. The polyethylene terephthalate base phase faced toward the heated roll during calendaring.

Example 22 comprises a portion of the extruded web material produced as Example 13 and calendared after web formation using one smooth, steel roll and one smooth rubber roll. The steel roll was heated to about 125° C. and the rubber roll was left at ambient temperature. The polyethylene terephthalate base phase faced toward the heated roll during calendaring.

The extruded web material of Example 20 was run on a D & W machine. The heat seal station of the D & W machine was set at 140° C. The web material of Example 20 generally maintained dimensional stability throughout the D & W machine, although some web stretching under tension was noticed. The Example 20 web material exhibited good cuttability of the web material into pieces prior to the heat seal station. Infusion packages produced had heat seal seams that were judged by the packing machine operator to be unacceptable as compared to infusion packages made from conventional cellulose based nonwoven material. Dimensional stability of the heat seal seam was judged by the packing machine operator to be acceptable. It is believed that stretching of the inventive web material under tension resulted in some heat seal seams of narrow width. Increasing the heat seal station temperature to 151° C. increased heat seal seam strength to acceptable levels, however shrinkage of the web in the heat seal station was noted.

The extruded web material of Example 21 was run on a C51 machine. Typically the C51 machine is used with cellulose based, heat sealable, nonwoven material such as exemplified by comparative Example 1. The heat seal station of the C51 machine was set at 180° C. The C51 machine includes a slitting station before the heat seal station to slit web material in the machine direction as the web material is traveling through the machine. The slitting station in this machine used a non-motorized blade. The web material of Example 21 did not have sufficient stiffness to be slit at the non-motorized slitting station of the C51 machine The web material of Example 21 was run on a different C51 machine. The slitting station (before the heat seal station) in this machine used a motorized blade. At a heat seal station temperature of 160° C., infusion packages formed were judged by the packing machine operator to be acceptable for seam strength and seam dimensional stability (material shrinkage during sealing) as compared to infusion packages made with cellulose based nonwoven material. No buildup of material at the heat seal station was noted. The web material cut well at the slitting station, but the web material had insufficient stiffness for the string of infusion packages to be cut into sets of two infusion packages.

The extruded web material of Example 22 was run on a C51 machine. The slitting station in this machine (before the heat seal station) used a motorized blade. At heat seal station temperatures in the range of 130° C. to 160° C., infusion packages were judged by the packing machine operator to be acceptable for seam strength and seam dimensional stability (material shrinkage during sealing) compared to infusion packages made from cellulose based nonwoven material. No buildup of material at the heat seal station was noted. The inventive web material cut well at the slitting station. The string of infusion packages could also be cut into sets of two infusion packages, however the inventive web material had insufficient stiffness to be cut by a non-motorized blade into individual infusion packages.

The extruded web material of Example 22 was run on an EC12 machine. The heat seal station of the EC12 machine was set to at a temperature of 96° C. The web material of Example 22 maintained dimensional stability over the EC12 tension rollers better than the web material of Example 8. The heat seal seams of infusion packages made with the Example 22 material were judged by the packing machine operator to have acceptable strength as compared to infusion packages made from conventional cellulose based nonwoven material. Dimensional stability of heat seal seams (material shrinkage during sealing) was also judged by the packing machine operator to be acceptable. The inventive web material had insufficient stiffness for cutting of the string of infusion packages into individual packages.

The extruded web material of Example 22 was run on a D & W machine. The heat seal station of the D & W machine was set at 149° C. The web material of Example 22 generally maintained dimensional stability throughout the D & W machine better than the web material of Example 7, although some web stretching under tension was noticed. The Example 22 web material exhibited good cuttability of the web material into pieces before the heat seal station. Infusion packages produced on the D & W machine had heat seal seams that were judged by the packing machine operator to be acceptable as compared to infusion packages made from conventional cellulose based nonwoven material. Dimensional stability of the heat seal seam (material shrinkage during sealing) was also judged by the packing machine operator to be acceptable. It is believed that stretching of the inventive web material under tension resulted in some heat seal seams of narrow width.

The web materials of Examples 21 and 22 were run together on a TECHNIPAC machine. The TECHNIPAC machine seals together nonwoven material from two separate rolls running simultaneously to form an infusion package. Typically, the nonwoven material used is cellulose based. The heat seal station of the TECHNIPAC machine was set at 165° C. The web materials each exhibited good cuttability in both the machine and cross machine directions and dimensional stability during heat sealing (material shrinkage during sealing). Infusion packages produced at this sealing temperature were judged by the packing machine operator to be acceptable as compared to infusion packages made from conventional cellulose based nonwoven material.

In summary, the extruded web materials of Examples 21 and 22 had dimensional stability during heat sealing (material shrinkage during sealing) and heat seal seam strength that was comparable to conventional cellulose based nonwoven material produced on the same machines under the same conditions. On some machine types, the extruded web materials of Examples 21 and 22 exhibited insufficient stiffness for some cutting operations as compared to conventional cellulose based nonwoven material.

Examples 23-27

Example 23 comprises a portion of the extruded web material produced as Example 11 and treated with an acrylic binder mixture to increase web material stiffness.

The binder mixture comprised:

| | |
|---|---|
| 100 parts | water |
| 22 parts | binder |
| 0.3 parts | ammonium hydroxide |
| 0.2 parts | surfactant |
| trace | defoamer |

The binder mixture was applied in a commercial size press to achieve a calculated binder pickup level of 20 percent after which the web material was dried. No antistatic agent was used. The extruded web materials of Examples 21 (calendared) and 23 (binder treated) were tested for physical properties. The results of this testing are listed in Table 3.

Example 24 comprises a portion of the extruded web material produced as Example 13 and treated with an acrylic binder mixture to increase web material stiffness. The binder mixture was the same as described with reference to Example 23. The binder mixture was applied in a commercial size press to achieve a calculated binder pickup level of 20 percent after which the web material was dried. No antistatic agent was used. The extruded web materials of Examples 22 (calendared) and 24 (binder treated) were tested for physical properties. The results of this testing are listed in Table 3. Also, included in Table 3 are selected physical properties for a conventional heat sealable cellulose fiber based web material listed as Example 25.

TABLE 3

| | Example 25 | Example 21 | Example 23 | Example 22 | Example 24 |
|---|---|---|---|---|---|
| basis weight (gsm) | 16.5 | 16 | 19 | 16 | 19 |
| dry elongation MD 250 gm load (%) | 0.2 | 0.9 | 0.7 | 1.1 | 0.8 |
| dry elongation MD 500 gm load (%) | 0.3 | 1.8 | 1.3 | 2.0 | 1.2 |
| dry elongation MD 750 gm load (%) | 0.4 | 4.3 | 2.0 | 4.2 | 1.6 |
| dry elongation MD 1000 gm load (%) | 0.5 | 9.2 | 3.4 | 8.8 | 2.1 |
| sealing jaw temp (F.) | 376 | 340 | 340 | 290 | 290 |
| bleed through (gm) | 11 | 1 | 5 | 21 | 22 |
| dry delamination MD (gm/25 mm width) | 190 | 410 | 540 | 810 | 890 |
| dry delamination CD (gm/25 mm width) | 150 | 340 | 670 | 540 | 410 |
| wet delamination MD (sec) [100 gm] | >1200 | >1200 | >1200 | >1200 | >1200 |
| wet delamination CD (sec) [100 gm] | >1200 | >1200 | >1200 | >1200 | >1200 |
| first color (sec) | 6.5 | 8.4 | 7.2 | 9.1 | 7.0 |
| transmittance (%) | 62.2 | 62.2 | 56 | 58.8 | 57.0 |
| "A" sand sift (%) | 10 | 73 | 73 | 27 | 31 |
| porosity (l/min/100 cc) | 890 | 1640 | 2170 | 1620 | 1700 |
| positive static delay (sec) | 1.1 | infinity | 41 | infinity | 40 |
| negative static delay (sec) | 1.2 | 120 | 0.1 | infinity | 39 |

As can be seen from the results of Table 3, the binder treatment increases extruded web material stiffness (as measured by MD dry elongation) and decreases static buildup. Surprisingly, the binder treatment has little effect on the remaining properties of the inventive web material. As shown by the dry elongation results, the inventive web materials, both binder free and binder treated, are not as stiff as conventional, cellulose based, heat sealable web material (Example 25).

Example 26 comprises a portion of the extruded web material produced as Example 11 and calendared between steel rolls after web formation. The polyethylene terephthalate base phase was in contact with a smooth, heated steel roll and the polypropylene sheath over polyethylene terephthalate core heat seal phase was in contact with a smooth, unheated steel roll. The top roll was heated to about 190° C. The bottom roll was unheated, although the roll temperature increased to about 120° C. during running of the web material. The web material of Example 26 was run at an initial roll speed of about fifty feet per minute, increasing to seventy five feet per minute during the run. The web material of Example 26 was run at a constant pressure of about 600 pounds per lineal inch.

Example 27 comprises a portion of the extruded web material produced as Example 13 and calendared between steel rolls after web formation. The polyethylene terephthalate base phase was in contact with a smooth, heated steel roll and the polyethylene sheath over polyethylene terephthalate core heat seal phase was in contact with a smooth, unheated steel roll. The top roll was heated to about 182° C. initially, increasing to about 186° C. during running of the web material. The bottom roll was unheated, although the roll temperature increased to about 115° C. during running of the web material. The web material of Example 27 was run at an initial roll speed of about fifty feet per minute, increasing to seventy five feet per minute during the run. The web material of Example 27 was run at a constant pressure of about 600 pounds per lineal inch.

The extruded web material of Example 24 was run on a D & W machine. The heat seal station temperature was reduced from 220° C. (the setting for conventional cellulose based heat sealable web material) to 150° C. The Example 24 material ran well over the test period of a few minutes. The infusion packages produced had heat seal seams that were judged by the packing machine operator to be acceptable as compared to infusion packages made from conventional cellulose based nonwoven material. There was no problem with cutting the web material into pieces before the heat seal station. No material buildup was noted at the heat seal station. A very few infusion packages having unsealed seams were found. The problem is believed due to contraction of the web material after cutting or web slippage in the machine. Tension on the web material was reduced which seemed to improve this issue somewhat. It should be noted that even infusion packages having seams of smaller than normal area exhibited acceptable seam strength.

The extruded web material of Example 24 was run on an EC12 machine. The heat seal station temperature was reduced from 120° C. to 90° C. for this trial. While there was some initial difficulty threading the inventive web material through the machine, once threaded the web material conveyed with relative ease. The string of infusion packages was easily cut into individual packages. Infusion packages produced during the trial were judged by the packing machine operator to have acceptable heat seal seam strength as compared to infusion packages made from conventional cellulose based nonwoven material. There was some difficulty in adjusting the timing of the cutter that separates individual infusion packages from the string of finished infusion packages. It is believed that adjustment of the machine would resolve this difficulty, however, due to time constraints machine adjustment was not attempted.

The extruded web material of Example 24 was run on a C51 machine. The non motorized blade at the slitting station (before the heat seal station) could not slit the inventive web material in the machine direction, resulting in stoppage of this trial.

The extruded web material of Example 24 was run on a second C51 machine. The slitting station (before the heat seal station) in this machine used a motorized blade. The heat seal station of this machine was set at about 130° C., a temperature that is significantly lower than typically used with conventional heat sealable cellulose based web materials. During this trial, the inventive web material processed easily and tracked well within the machine. The string of infusion packages cut easily into individual packages. Infusion packages produced during the trial were judged by the packing machine operator to have acceptable heat seal seam strength as compared to infusion packages made from conventional cellulose based nonwoven material. No heat seal seams were found to be missing in infusion packages produced during the trial. Width of the heat seal seam for each of the four sides of a number of the infusion bags produced was measured and recorded. The measured seam widths were found to be comparable to the seam widths of infusion packages prepared on the same machine using conventional heat sealable cellulose based web material. At the conclusion of the trial no build up or sticking of the web material on the machine was noted.

The extruded web material of Example 24 was placed onto both unwind stations of a TECHNIPAC machine. The heat seal station was set at 124° C. In spite of the roll of web material being slightly too wide, the inventive web material processed easily and numerous infusion packages were produced. No significant problems were observed during the test run. Web material tracking, cutting of the string of infusion packages into individual packages, and heat sealing were judged to be acceptable by the packing machine operator during this trial. Infusion packages produced during this trial were judged by the packing machine operator to have acceptable heat seal seam strength as compared to infusion packages made from conventional cellulose based nonwoven material.

The extruded web material of Example 26 was run on a D & W machine. The heat seal station temperature was reduced from 220° C. (the setting for conventional cellulose based heat sealable web material) to 170° C. The Example 26 material ran well over the test period of a few minutes. The infusion packages produced had heat seal seams that were judged by the packing machine operator to have acceptable heat seal seam strength as compared to infusion packages made from conventional cellulose based nonwoven material. There was no problem with cutting of the web material into pieces before the heat seal station. No material buildup was noted in the heat seal portion of the machine at the conclusion of the test period.

The extruded web material of Example 26 was run on an EC12 machine. The heat seal station temperature was set at about 102° C. for this trial. The inventive web material conveyed with relative ease. The string of finished infusion packages was easily cut into individual packages. Infusion packages produced during the trial were judged by the packing machine operator to have acceptable heat seal seam strength as compared to infusion packages made from conventional cellulose based nonwoven material. There was some difficulty in adjusting timing of the cutter separating individual infusion packages off of the string of finished infusion packages.

The extruded web material of Example 26 was run on a C51 machine. The slitting station (before the heat seal station) in this machine used a non-motorized blade. As was previously observed, the non motorized blade could not slit the inventive web material in the machine direction resulting in stoppage of this trial.

The extruded web material of Example 26 was run on another C51 machine. The slitting station in this machine (before the heat seal station) used a motorized blade. The heat seal station of this machine was set at about 160° C. During this trial the inventive web material ran "loosely" in the machine, leading to tracking problems at various stations. The tracking problems contributed to variation in package to package heat seal seam width and problems with timing of the cutter separating the string of infusion packages into sets of two infusion packages. However, when cutter timing was correct the machine easily cut the string into sets. Surprisingly, the heat seal seam strength was judged by the packing machine operator to be acceptable as compared to infusion packages made from conventional cellulose based nonwoven material even for seams of less than optimum width. At the conclusion of the trial no build up or sticking of the web material on the machine was noted.

The extruded web material of Example 27 was run on a D & W machine. The heat seal station temperature was reduced from 220° C. (the setting for conventional heat sealable cellulose based web material) to 150° C. The Example 27 material ran well over the test period of a few minutes. Infusion packages produced were judged by the packing machine operator to have acceptable heat seal seam strength as compared to infusion packages made from conventional cellulose based nonwoven material. There was no problem with cutting of the web material into pieces before the heat seal station. No material buildup was noted in the heat seal portion of the machine at the conclusion of the test period. A very few infusion packages having unsealed seams were found. The problem is believed due to contraction of the web material after cutting or web slippage in the machine. Tension on the web material was reduced which seemed to improve this issue somewhat. Surprisingly, even infusion packages having seams of smaller than normal area produced exhibited adequate seam strengths.

The extruded web material of Example 27 was run on a C51 machine. The slitting station (before the heat seal station) in this machine used a motorized blade. The heat seal station of this machine was set at about 130° C., a temperature that is significantly lower than typically used with cellulose based heat sealable web materials. During this trial the inventive web material ran "loosely" in the machine, leading to tracking problems at various stations. The tracking problems contributed to variation in package to package heat seal seam width and problems with timing of the cutter separating the string of infusion packages into sets of two infusion packages. However, when cutter timing was correct the machine easily cut the string into sets. Surprisingly, the heat seal seam strength was judged by the packing machine operator to be acceptable as compared to infusion packages made from conventional cellulose based nonwoven material even for seams of less than optimum width. At the conclusion of the trial no build up or sticking of the web material on the machine was noted.

The materials of Examples 21-22 and 24-27 were tested for certain physical properties and the results are listed in Table 4.

TABLE 4

|  | Comp. Example 25 | Example 24 | Example 27 | Example 26 | Example 21 | Example 22 |
|---|---|---|---|---|---|---|
| basis weight (gsm) | 16.5 | 19 | 16 | 16 | 16 | 16 |
| thickness (mil) | 92 | 80 | 50 | 63 | 73 | 53 |
| dry elongation MD 250 gm load (%) | 0.2 | .8 | 0.4 | 0.5 | 0.9 | 1.1 |
| dry elongation MD 500 gm load (%) | 0.3 | 1.2 | 0.8 | 0.8 | 1.8 | 2.0 |
| dry elongation MD 750 gm load (%) | 0.4 | 1.6 | 1.2 | 1.2 | 4.3 | 4.2 |
| dry elongation MD 1000 gm load (%) | 0.5 | 2.1 | 1.6 | 1.6 | 9.2 | 8.8 |
| sealing jaw temp (F.) | 376 | 290 | 290 | 340 | 340 | 290 |
| bleed through (gm) | 11 | 22 | 4 | 1 | 1 | 21 |
| dry delamination MD (gm/25 mm width) | 190 | 890 | 890 | 530 | 410 | 810 |
| dry delamination CD (gm/25 mm width) | 150 | 410 | 460 | 460 | 340 | 540 |
| wet delamination MD (sec) [100 gm] | >1200 | >1200 | >1200 | >1200 | >1200 | >1200 |
| wet delamination CD (sec) [100 gm] | >1200 | >1200 | >1200 | >1200 | >1200 | >1200 |
| first color (sec) | 6.5 | 7.0 | 8.4 | 7.3 | 8.4 | 9.1 |
| Transmittance (%) | 62.2 | 57.0 | 58.6 | 58.7 | 62.2 | 58.8 |
| "A" sand sift (%) | 10 | 31 | 27 | 64 | 73 | 27 |
| porosity (l/min/100 cc) | 890 | 1700 | 1230 | 1870 | 1640 | 1620 |
| positive static decay (sec) | 1.1 | 40 | infinity | infinity | infinity | infinity |
| negative static delay (sec) | 1.2 | 39 | 240 | infinity | 120 | infinity |

As previously stated, comparative Example 25 is a conventional cellulose based, wet laid, heat sealable web material exemplary of the web materials typically run on packing machines using heat and pressure type sealing processes. The strength and dry elongation under load properties of Examples 24, 26 and 27 are somewhat less desirable than the same properties of Example 25, although the web materials of Examples 26 and 27 were successfully run on a variety of packing machines using heat and pressure type sealing processes. The web materials of Examples 24, 26 and 27 also had infusion properties acceptable for use as infusion packaging.

The web materials of Examples 21 and 22 are inferior in strength and dry elongation under load properties to the same properties of Examples 24, 25, 26 and 27. The web materials of Examples 21 and 22 did not run as well on the same variety of packing and sealing machines as the web materials of Examples of 24, 26 and 27.

As will be apparent to persons skilled in the art, various modifications, adaptations and variations of the foregoing specific disclosure can be made without departing from the teaching of the present invention.

What is claimed:

1. An infusion sheet material comprising a first web comprising biodegradable thermoplastic spunbonded filaments having a first melting point overlying a second web comprising thermoplastic spunbonded filaments having a second melting point different than the first melting point, the first and second webs being point-bonded to one another by only thermal bonding with a calendar roll to form the infusion sheet material, wherein the point-bonded material has a dry elongation value in the range of 0.5 percent to 2 percent under a 1000 gram load (TAPPI T494 OM 88 method) and a first color time of less than 13 seconds as measured using the First Color Time Test.

2. The material of claim 1 having a basis weight within the range of about 1 to about 80 grams per square meter.

3. The material of claim 1 wherein at least a portion of the filaments of at least one of the first and second webs comprises bicomponent filaments having a core and a sheath, and the melting point of the bicomponent filaments is the melting point of the sheath.

4. The infusion sheet material of claim 1 having a basis weight in the range of about 10 to about 30 grams per square meter.

5. The infusion sheet material of claim 1 having a heat seal seam wet delamination strength of more than 600 seconds.

6. The material of claim 1 wherein the material is configured for use on a high speed packing machine using a heat and pressure sealing process.

7. The infusion sheet material of claim 1 having a bleed through of no more than 40 grams when tested using a bleed through test.

8. The material of claim 1 wherein the first web has a melting point higher than the second web.

9. The material of claim 1, having a percent transmittance of less than 75% as measured using the Percent Transmittance Test.

10. The material of claim 1 wherein the first web has a melting point higher than the second web and the filaments of the first web have a denier in the range of about 1 to about 5.

11. The infusion sheet material of claim 1 having a basis weight within the range of 16 to 19 grams per square meter.

12. The infusion sheet material of claim 1, wherein the biodegradable thermoplastic spunbonded filaments comprise polylactic acid.

13. The infusion sheet material of claim 1, including least one of a stiffening agent, an antistatic agent, a surfactant, and a repellant material.

14. An infusion bag formed from the sheet material of claim 1.

15. The infusion sheet material of claim 3, wherein the biodegradable thermoplastic spunbonded filaments comprise polylactic acid.

16. The infusion sheet material of claim 3, including least one of a stiffening agent, an antistatic agent, a surfactant, and a repellant material.

17. An infusion bag formed from the sheet material of claim 3.

* * * * *